UNITED STATES PATENT OFFICE.

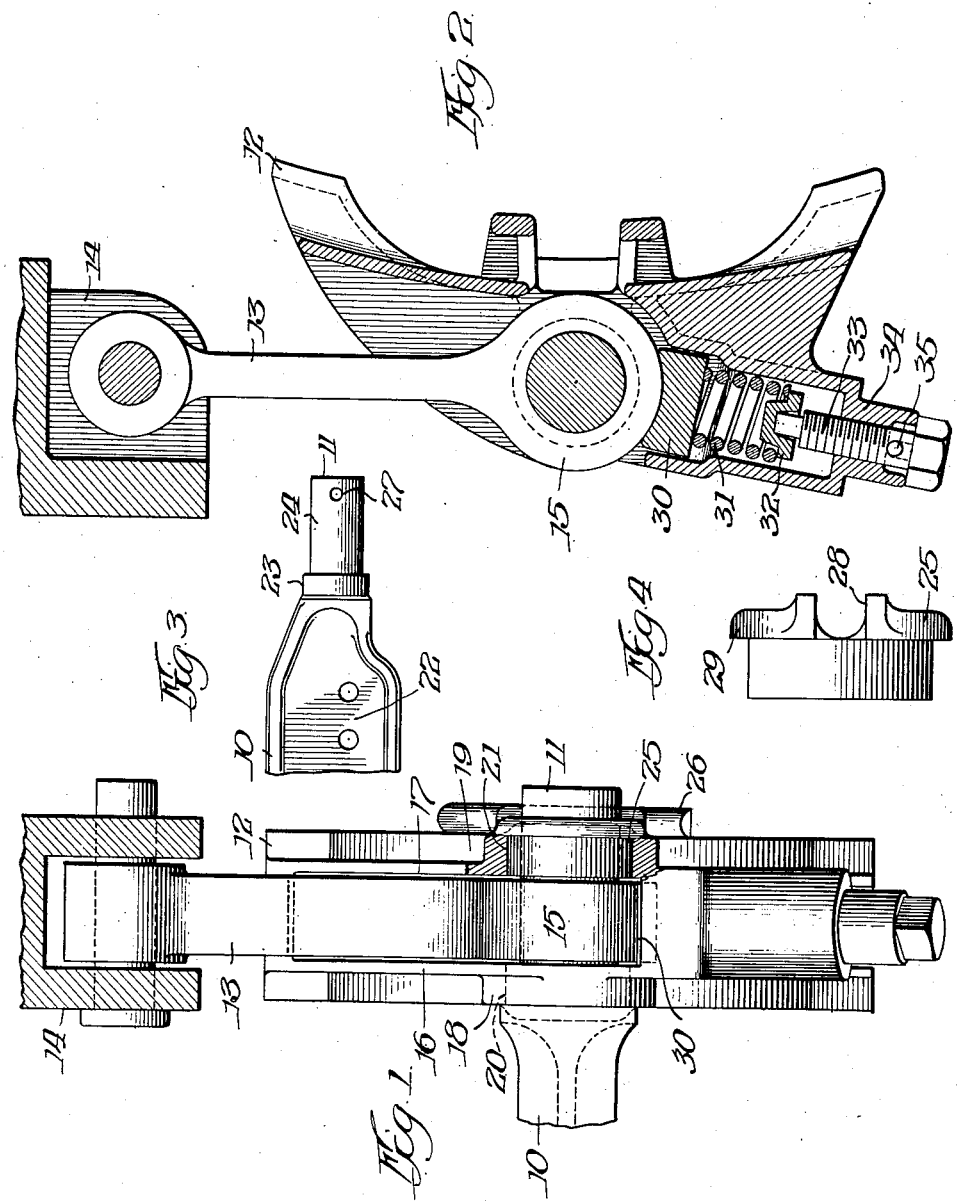

WILLIAM C. HEDGCOCK, OF CHICAGO, ILLINOIS, ASSIGNOR TO AMERICAN STEEL FOUNDRIES, OF CHICAGO, ILLINOIS, A CORPORATION OF NEW JERSEY.

BRAKE MECHANISM.

1,325,516.     Specification of Letters Patent.     Patented Dec. 23, 1919.

Application filed July 27, 1917. Serial No. 183,050.

*To all whom it may concern:*

Be it known that I, WILLIAM C. HEDGCOCK, a citizen of the United States, residing at Chicago, in the county of Cook and State of Illinois, have invented certain new and useful Improvements in Brake Mechanism, of which the following is a specification.

This invention relates to brake mechanism and more particularly to a novel brake beam, brake head and brake hanger arrangement.

One of the objects of the invention is to connect brake beams, heads and hangers in a novel manner making the same more durable and at the same time occupying a minimum amount of space.

Another object is to adjustably support in a novel manner a brake head so that the same is rotatable about the center line of its trunnion and yet maintained in any desirable position.

Another object is to provide a novel combination of a brake beam, head and hanger adapted to meet the various requirements for successful commercial operation.

These and other objects are accomplished by providing in brake mechanism the combination of a brake beam having a stepped trunnion for the reception of a brake head, or hanger, or both. More specifically stated, the objects are accomplished by providing in brake mechanism the combination of a brake beam having a trunnion, one portion of which is larger than another portion along the length of the trunnion, a brake head, only one portion of which engages the larger portion of the trunnion, and means located between the brake head and a smaller portion of the trunnion forming a bearing for the brake head.

The invention is illustrated on the accompanying sheet of drawings in which Figure 1 is a rear elevation, parts being in section, of brake mechanism embodying my invention;

Fig. 2 is a longitudinal sectional view of the same;

Fig. 3 is a fragmentary plan view of a brake beam having my novel trunnion; and

Fig. 4 is a side elevation of a collar member forming a part of my invention.

The various novel features of the invention will be apparent from the following description and drawings and will be particularly pointed out in the appended claims.

Referring to the figures of the drawing it will be seen that I have provided, generally speaking, a brake beam 10 having a trunnion 11 upon which a brake head 12 is mounted, and a hanger 13 pivotally connected at its upper end to a suitable support 14, the lower end of the hanger being provided with an eye portion 15 which receives the trunnion member 11.

More specifically, the brake head 12 is provided with spaced webs 16 and 17, the bearing portions 18 and 19 respectively, of which are provided with registering openings 20 and 21, preferably of the same size. The lower end of the hanger 13 is located between the webs or flanges 16 and 17 of the brake head. The width of the brake head as viewed in Fig. 2 is usually restricted on account of clearance conditions. When, therefore, the brake hanger is pivoted on the brake beam trunnion, which passes through the center of the brake head, it is necessary to restrict the diameter of the lower eye 15 of the brake hanger. To provide sufficient metal in the eye 15 of the brake hanger it follows that it is necessary to restrict the dimension of the trunnion 11 of the brake beam over which the hanger rotatably fits.

Referring particularly to Fig. 3 of the drawings showing the brake beam 10, the fulcrum jaws to which the brake levers are connected for transmitting the forces to the brake beams and thence to the brake heads to the shoes, are not shown. It will be understood, however, that the end fulcrums are connected to the brake beams 10 at points 22 adjacent the trunnion portions (only one of which is shown). On account of the relatively great braking forces transmitted to the beam through the medium of the fulcrum jaws at points 22, the restricted size of the trunnion if maintained of the same diameter at the inner shoulders of the brake heads, would not be sufficient to provide the proper strength to withstand such forces. Therefore, I have enlarged the inner portion 23 of each of the trunnions, making it of such diameter at this point as to be of ample strength. This enlarged diameter of the trunnion bears in only the inner trunnion bearing 18 of the brake head. The greater part 24 of the trunnion is reduced thereby making a stepped trunnion. The inner part of the reduced portion 24 of the trunnion receives the eye portion 15 of the brake hanger 13. In this way ample strength is provided in the brake beam trunnion at the inner shoulder 23 thereof where the greatest bending force occurs, and at the same time a sufficiently small bearing is provided for the brake hanger so that the diameter of the brake hanger eye 15 is not excessive. Since both trunnion bearings or openings 20 and 21 in the brake head are the same diameter and of such diameter as to fit the largest part 23 of the brake beam trunnion (so that the brake heads will be symmetrical and not rights and lefts), I have provided a collar 25 to fill the annular space between the outer bearing 19 of the brake head and the outer reduced portion 24 of the trunnion. A cotter pin 26 passes through an opening 27 in the brake beam trunnion to retain the brake head 12 and the collar 25 in position on the trunnion, and in turn retain the brake hanger 13 in position. In order that the collar 25 will not work or rotate around and cause excessive wear, I have provided a slot 28 in the collar into which the cotter pin 26 is inserted at the same time it is inserted into the hole 27 in the trunnion. By this means through the engagement of the cotter pin 26 with the slot 28 in the collar 25 and the hole 27 in the trunnion, the collar 25 is retained against rotation on the trunnion. The lip 29 on the collar 25 also provides bearing surface for the brake head so that the wear and thrust is taken to a great extent by this lip 29 instead of by the cotter pin 26.

In order to hold the brake head against free rotation about the brake beam trunnion, I have provided frictional locking means including a locking block 30 which engages with the eye portion 15 of the brake hanger and is yieldingly pressed into engagement therewith by a resilient member or spring 31 having a seat 32 which is engaged by an adjusting screw 33 threaded through the lower end of a pocket 34 which holds the block 30, spring 31, seat 32 and screw 33. The screw may be adjusted to various positions to vary the degree of frictional holding effect of the block 30 upon the hanger 15 and thereby upon the brake head 12, the screw being locked in any adjustable position by a suitable key 35. By means of this arrangement the brake head is adjustably maintained in any desired position and at the same time is allowed to freely and automatically adjust itself to the relative position of the wheel.

By means of this arrangement the parts are made to occupy a minimum amount of space and at the same time have the requisite amount of strength to meet the requirements for successful commercial operation.

It is evident that there may be various modifications of the arrangement herein particularly shown and described, and it is my intention to cover all such modifications which do not involve a departure from the spirit and scope of the invention as set forth in the following claims.

I claim:

1. In brake mechanism, a brake beam having a trunnion with relatively large and small portions, the larger portion for the reception of a brake head and the smaller for the reception of a brake hanger.

2. In brake mechanism, the combination of a brake beam having a trunnion with relatively large and small portions, a brake head, one portion of which is received by the large trunnion portion, and a brake hanger which receives the relatively small trunnion portion.

3. In brake mechanism, the combination of a brake beam having a trunnion with a relatively large portion and a relatively small portion, a brake head, the inner portion of which receives the larger trunnion portion, and a brake hanger which receives the relatively small trunnion portion.

4. In brake mechanism, the combination of a brake beam having a stepped trunnion, a brake head having a portion which engages one portion of the trunnion, a hanger which engages another portion of the stepped trunnion, and means interposed between another portion of the brake head and a portion of the trunnion for bearing purposes.

5. In brake mechanism, the combination of a brake beam having a trunnion with relatively large and small portions, a brake head having spaced webs with bearings, one of which is mounted over the larger trunnion portion, and a hanger located between said webs and being mounted over a smaller portion of said trunnion.

6. In brake mechanism, the combination of a brake beam having a trunnion with relatively large and small portions, a brake head having spaced webs with bearings, one of which is mounted over the larger trunnion portion, a hanger located between said webs and being mounted over a smaller portion of said trunnion, and a collar interposed between a smaller portion of said trunnion and the bearing of the other web.

7. In brake mechanism, the combination of a brake beam having a trunnion having relatively large and small portions, a brake head having webs with openings, one of which openings receives the larger trunnion portion and the other of which openings receives the smaller trunnion portion, a hanger mounted over said trunnion intermediate the webs, a collar interposed between the opening in one of said webs and a smaller portion of the trunnion, and means for locking the collar on said trunnion.

8. In brake mechanism, the combination of a brake beam having a stepped trunnion, a brake head mounted thereon, a hanger mounted over said trunnion, and a collar interposed between a portion of said head and trunnion.

9. In brake mechanism, the combination of a brake beam having a stepped trunnion, a brake head mounted thereon, a hanger mounted over said trunnion, a collar interposed between a portion of said head and trunnion, and means for locking the collar to said trunnion.

10. In brake mechanism, the combination of a brake beam having a trunnion, a brake head mounted on said trunnion, a brake hanger also mounted on said trunnion, and means bearing against a portion of said brake hanger for adjustably locking the brake head.

11. In brake mechanism, the combination of a brake beam having a trunnion, a brake head mounted on said trunnion, a brake hanger also mounted on said trunnion, and means carried by the head and engaging a portion of the hanger for adjustably locking the brake head.

12. In brake mechanism, the combination of a brake beam having a trunnion, a brake head with spaced webs mounted on said trunnion, a hanger mounted on said trunnion intermediate said webs, and means frictionally engaging a portion of the brake hanger to adjustably lock the brake head in different angular positions.

Signed at Chicago, State of Illinois, this 18th day of July, A. D. 1917.

WILLIAM C. HEDGCOCK.